United States Patent [19]

Delahunty

[11] Patent Number: 4,576,664
[45] Date of Patent: Mar. 18, 1986

[54] FIXING ARTICLE HOLDERS TO SURFACES
[75] Inventor: Michael D. Delahunty, Dublin, Ireland
[73] Assignee: Ducata Limited, Dublin, Ireland
[21] Appl. No.: 565,613
[22] Filed: Dec. 27, 1983
[30] Foreign Application Priority Data Jan. 3, 1983 [IE] Ireland .................................. 5/83
May 17, 1983 [IE] Ireland .............................. 1143/83

[51] Int. Cl.$^4$ ............................................. B32B 31/12
[52] U.S. Cl. ...................................... 156/71; 24/304;
24/DIG. 11; 156/330; 206/231; 206/568;
248/27.8; 248/205.3; 248/499; 428/99
[58] Field of Search ................... 156/71, 330; 206/219,
206/568, 582, 231; 248/205 A, 499, 27.8, 205.3;
428/99; 24/304, DIG. 11

[56] References Cited
U.S. PATENT DOCUMENTS 3,837,981  9/1974  Flint .................................. 156/330 X
4,025,015  5/1977  Kolic ............................... 248/205 A
4,153,156  5/1979  Seemann et al. ..................... 206/219

FOREIGN PATENT DOCUMENTS 83307882.7            European Pat. Off. .
1615213  9/1950  Fed. Rep. of Germany .
1691401  1/1955  Fed. Rep. of Germany .
1003770  9/1965  United Kingdom .
1218274  1/1971  United Kingdom .
1277425  6/1972  United Kingdom .
1312880  4/1973  United Kingdom .
1345011  1/1974  United Kingdom .
1345012  1/1974  United Kingdom .
1426809  3/1976  United Kingdom .
1452785  10/1976  United Kingdom .
1524199  9/1978  United Kingdom .

Primary Examiner—Robert A. Dawson
Attorney, Agent, or Firm—Stevens, Davis, Miller & Mosher

[57] ABSTRACT

A fixing device is disclosed for use on hard surfaces such as exterior walls, wood, glass or metal for supporting elements, particularly elongate elements, against such surfaces. The fixing device comprises in combination a holding member, for example a plastics plant tie cable grip or pipe clasp, and a portion of an adhesive composition of putty consistency. The holding member has a cup portion which defines a socket. The composition is a filled hardenable adhesive composition including an adhesive component such as epoxide resin and a hardener component such as a mercaptan/amine-accelerated polyamide hardener which are separately present in the composition in pre-determined proportions such that the composition is workable by hand to mix the components and activate a hardening reaction. In use, a portion of the composition may be separated from a ribbon and mixed between the fingers to form a pellet which is pressed into the socket of the holding member to fill the socket, the device then being pressed onto a hard surface and time allowed for the composition to become rock hard and bond to the surface.

10 Claims, 16 Drawing Figures

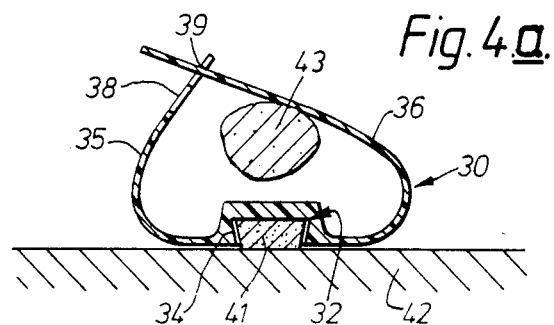
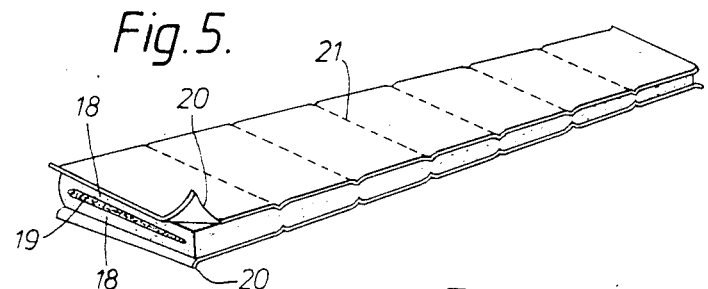
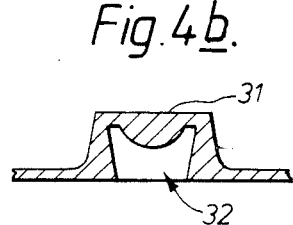
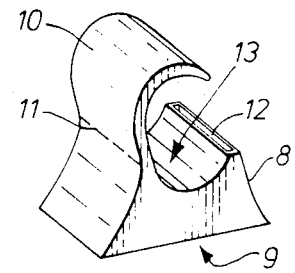
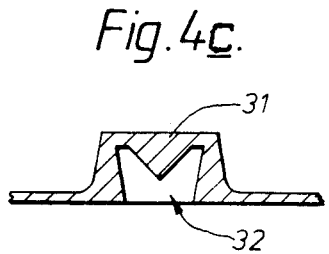
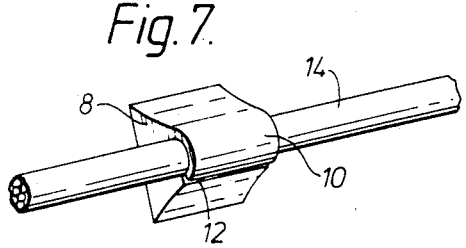

FIXING ARTICLE HOLDERS TO SURFACES

BACKGROUND OF THE INVENTION

1. Field of the Invention

This invention relates to a fixing device for use on hard surfaces, particularly for supporting elongate elements such as plant stems, electric cables, cords, wires, pipes, elements of a framework or mesh and the like, and to a method of supporting such elements against or adjacent to a hard surface. In particular the invention provides a wall fixing which obviates the need for nails or screws, thus being suitable for use on glass or metal surfaces.

As used herein, the term "wall fixing" embraces a fixing suitable for use on any hard surface including brick, stone, masonry, concrete, wood, glass, or metal, which surface is not necessarily vertical. "Against a hard surface" means means in contact with the surface, adjacent or in proximity to the surface.

2. Description of the Prior Art

Some known wall fixings which do not include nails or screws have comprised a flat base plate with a self-adhesive layer protected by a peel-off strip, with various forms of fastening means such as resilient clips or clasps extending from the upper surface of the plate, e.g. as disclosed in British Patent Specification Nos. 1,345,011, 1,345,012, 1,426,809 and U.S. Pat. No. 4,025,015. Typically, fixings of this type are employed as electric cable clips.

British Patent Specification No. 1,218,274 discloses a tie-down plate whose bottom surface is adapted to receive adhesive material thereon in open channels extending from one side of the plate to the other. Two of the channels are of "Ω" cross-section so as to provide a key between the cured adhesive and the tie-down plate when secured to a mounting surface. The tie-down plate also includes an aperture through which a cable-bundling strap may be passed.

SUMMARY OF THE INVENTION

It is an object of the present invention to provide a fixing which can be used on a wide variety of hard surfaces, particularly rough surfaces such as external walls of buildings and gardens, and including curved or rounded surfaces and pebble-dashed walls.

According to the invention, there is provided a fixing device for use on hard surfaces comprising in combination a holding member for holding elements to be supported against the hard surface, said holding member having a cup portion defining a socket, and a portion of a filled hardenable adhesive composition of sufficient volume to fill the socket in the holding member wherein the composition includes an adhesive component and a hardener component which are separately present in the composition, the composition having the consistency of putty and being workable by hand to mix the two components and activate a hardening reaction in the composition, so that the portion of the composition placed in the socket can bond the fixing device to the hard surface.

Preferably the holding member is made of plastics material.

Advantageously, the socket includes means to provide a key between the socket and a portion of the composition placed therein, such that when said portion is in a hardened state it is positively retained in the socket.

Preferably, the means to provide a key between the socket and the portion of the composition is provided by the inside wall or walls of the socket which taper inwardly towards the opening of the socket. Alternatively, or in addition, a rib projects from the inside wall or walls of the socket to provide a key between the socket and a portion of the said composition placed therein.

Advantageously, the inside wall of the socket is of annular or frustoconical configuration, while the base of the socket is substantially circular being plane, conical or domed, and the plastics material of the holding member is such that it does not adhere to a portion of the composition placed therein. In use, such a holding member is free to swivel by its socket about said portion of the composition in its hardened state when said portion has adhered to the hard surface. The socket of the holding member can alternatively be formed of non-plastics material, in which case it is not necessary to include means to provide a key between the socket and the portion of the composition. For example, the holding member may be of plastics material with a metal cup portion, or a metal insert forming the socket walls within a plastics cup portion. The holding member includes any means for holding or supporting elements such as elongate elements against a surface. For example, the holding or supporting means may comprise a clasp having two parts adapted to be fastened together in order to substantially surround an elongate element. The two parts may comprise a flexible tie, or may be adapted to be fastened together by passing one part having barbs along its edges through an enlarged aperture in the other part in the known manner of a plant tie, or may be adapted for snap-fitting interengagement. Alternatively, other elements may be held or supported by the holding member by means of any suitable bracket or hanging means, a loop, hook, eye or aperture, or fastener, suitable for supporting the particular element against a surface.

Preferably, the filled hardenable adhesive composition is in a ready-to-mix form, wherein the adhesive component and the hardener component are separately present in the composition in the correct proportions for admixture. The adhesive may be microencapsulated in a matrix including the hardener component. The ready-to-mix components are preferably combined together with a breakable membrane or film of inactive material at their interface.

In a preferred embodiment of the invention, a plurality of portions of the filled hardenable adhesive composition are provided in bulk form, each portion of suitable volume being separable from the remaining portions at predetermined locations. Preferably the composition is in ribbon form wherein the ribbon includes separate layers of adhesive and hardener components in contact with each other, and it is particularly preferred to provide a backing strip on each side of the ribbon. Preferably, the ribbon is transversely perforated, cut or indented at equally spaced intervals along its length, whereby individual portions of the composition may be torn therefrom. Each portion may be further indentifiable by means of suitable indicia printed on the surface of the backing strips.

Alternatively, separate portions of the composition may be provided in tablet form. When in tablet form, the separate portions are completely covered in a protective film of backing material, prior to use.

The protective film or backing strip for the composition may comprise a thin breakable film of low-density plastics material. In use, when a portion of such a composition is mixed between the fingers, the film is not removed, but tends to become indistinguishable in the resultant mixture, without affecting bonding or adhesion properties of the hardened composition.

The invention also provides a method of supporting an element against a hard surface which comprises the steps of:
(i) Mixing a portion of a filled hardenable adhesive composition of putty consistency including an adhesive component and a hardener component which are separately present in the composition in pre-determined proportions, so as to form a pellet of the composition in which a hardening reaction has been activated,
(ii) Pressing the pellet into a socket defined by a cup portion in a holding member,
(iii) Pressing the pellet with the holding member onto a surface at the desired position,
(iv) Allowing a sufficient period of time to elapse for the pellet to harden,
(iv) Positioning an element adjacent the holding member and securing it thereto to support the element against or adjacent to the surface.

Normally, the portion of the filled hardenable adhesive composition is mixed by hand between the user's fingers to form a pellet after removing a protective cover of backing material from said portion. However, the mixing step may also be performed without first removing the backing material.

In another aspect, the invention also provides a kit of parts comprising:
(i) A plurality of holding members as defined hereinabove,
(ii) A plurality of portions of a filled hardenable adhesive composition as defined hereinabove, and
(iii) Instructions for the user to combine a holding member and a portion of the composition for use as a fixing for elements including elongate elements such as plant stems, electric cables, cords, wire, pipes, elments of a framework or mesh and the like.

In a preferred embodiment, the kit comprises a consumer pack including a card with printed user's instructions and a transparent blister or polyethylene skin fixed thereto enclosing a plurality of holding members and perforated ribbons, or tablets of the filled hardenable adhesive composition.

The fixing device of the present invention has the advantage of being convenient to use in that no special tools are required—it requires very litle time and effort on the part of the user to work the portion of the adhesive composition between his thumb and forefingers to form a pellet prior to pressing the pellet of the mixed composition into the socket of the holding member. The putty consistency of the composition also has the advantage over similar compositions of liquid consistency of being capable of filling and adhering to rough surfaces by virtue of the fact that positive pressure is applied to the portion of the composition in the socket when the fixing device is being pressed onto a wall or the like in use. The adhesive composition has the ability to provide intimate contact with a rough, concave or convex surface rather than just providing point contact. The volume of the portion of the composition is sufficient to fill the socket and to bulge out from the rim of the socket, prior to being pressed onto the surface. Furthermore, the fact that the adhesive and hardener components are separately present in the portion of the composition in the correct proportions for admixture is more convenient and simpler for mixing them together than similar compositions wherein the adhesive and hardener components are supplied in separate containers and where the user must determine how much of each component is required.

In each of the embodiments described herein, an essential part of the invention resides in the provision of a portion of a filled hardenable adhesive composition which in use provides the necessary adhesion between the holding member of the fixing and a hard surface, such as a wall. Preferred compositions are described in British Patent Specification Nos. 1,452,785 and/or 1,277,425.

The composition includes an adhesive such as epoxide resin and a suitable hardener such as polyamide and an accelerator such as a mercaptan/amine. The composition has the consistency of putty. The adhesive component may be white in colour and the hardener component may be black, so that when the user mixes the two components between the fingers a substantially homogenous grey-coloured composition results, which will become rock hard after a short period of time. Different colouring additives may be used if desired.

For a more attractive appearance when the wall fixing is used as a plant tie, the holding member is preferably green in colour. Similarly, a green colouring additive may be present in the hardener, such that when the adhesive and the hardener are mixed together the resultant colour of the hardenable composition is a substantially matching green.

The preferred form of the filled hardenable adhesive composition in the present invention is that of a ribbon comprising either:

(a) A two-part mercaptan/amine-accelerated polyamide-cured epoxide resin putty extruded concentrically and then shaped into a flattened ribbon or tape. The air-sensitive mercaptan/amine-accelerated hardener is substantially encased within the outer protective sheath of filled epoxide resin adhesive. Both resin and hardener components consist of approximately 50% of active components filled primarily with talc and with small amounts of other inorganic inert materials which are present as thickening agents. The ribbon is contained within interleaves of silicone-treated high density polyethylene backing film, or paper.

or (b) A two-part polyamide-cured epoxide resin putty extruded as two ribbons or tapes side by side and in contact, one including the adhesive and the other including the hardener. Both resin and hardener components consist of approximately 50% of active components filled with talc and other inorganic inert fillers. The ribbon is contained within backing sheets.

It will be appreciated that the inert fillers present in the adhesive and hardener components give the composition its essential putty consistency which enables the composition to be easily workable by hand between the fingers so as to mix the two components and activate a hardening reaction in the composition. When working the composition, it does not stick to the fingers before or after the two components are thoroughly mixed together. As used herein, the term "filled" composition refers to a composition including any inert filler as a thickening agent, for example talcum powder, powdered glass, copper, aluminum or steel.

The accelerated composition (a) is preferred because when the two components are mixed together, the composition hardens in a period of 5 to 8 minutes. The hardening time for composition (b) is from 30 to 40 minutes.

Both (a) and(b) are commercially available from CELTITE (SELFIX) LTD., Alfreton, Derbyshire, U.K. (the former is sold under licence from Polymeric Systems Inc., U.S.A.).

BRIEF DESCRIPTION OF THE DRAWINGS

Preferred embodiments of a wall fixing of the present invention will now be described in further detail with reference to the accompanying drawings, in which:

FIG. 4a shows the plant tie of FIG. 3 in use, but in cross-section viewed from above, FIGS. 4b and 4c show cross-sections of alternative socket profiles of the plant tie of FIG. 3, FIG. 5 shows a ribbon of a filled hardenable adhesive composition of putty consistency, FIG. 6 shows a cable grip according to a third embodiment, FIG. 7 shows the cable grip of FIG. 6 in use.

DESCRIPTION OF PREFERRED EMBODIMENTS

Figure 1:
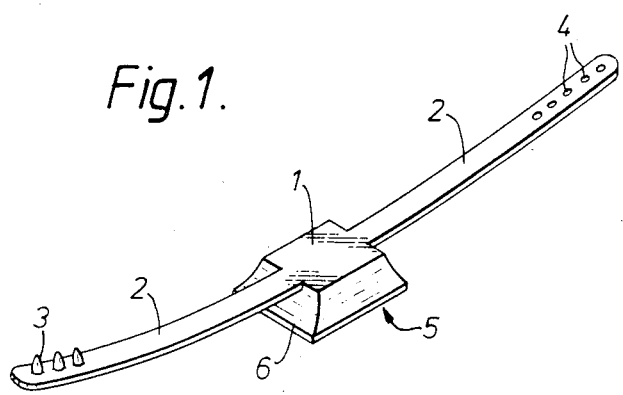
FIG. 1 shows a plant tie according to a first embodiment of the invention.
Figure 2:
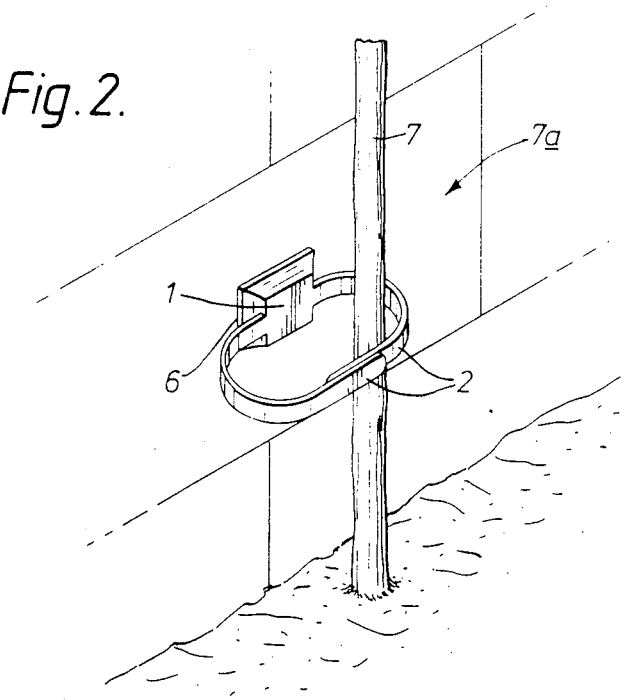
FIG. 2 shows the plant tie of FIG. 1 in use.

FIG. 1 shows a wall fixing primarily for use as a plant tie in plastics material such as polypropylene or polyethylene which comprises a holding member having a cup 1 and flexible ties 2 extending from opposite sides of the rim of the cup. Alternatively, the ties 2 may extend from the base of the cup 1. One tie has studs 3 adapted for snap-fitting engagement with corresponding holes 4 in the other tie. The cup 1 defines a socket 5 with a rim formed by a thin flexible skirt 6. In use, a pellet of a filled hardenable adhesive composition is pushed into the socket 5 and the fixing is then pressed onto a clean hard surface so that the pellet adheres to the surface and the skirt 6 firmly engages with the surface. Ribs (not shown) project from the inside walls of the socket 5 so as to provide a key with the pellet of the composition when it has hardened. As shown in FIG. 2, the ties 2 are snapped together about a plant stem 7 once the pellet has hardened so as to support the plant stem against or adjacent to the surface of a wall 7a.

Figure 3:
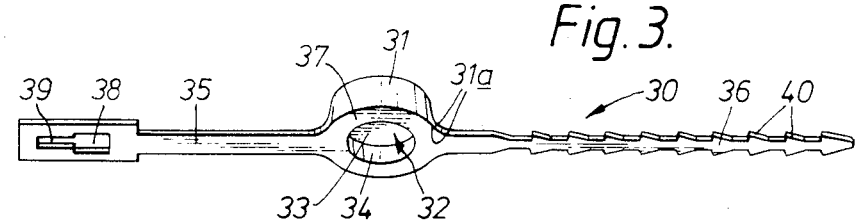
FIG. 3 shows a plant tie according to a second embodiment.

FIG. 3 shows a wall fixing 30 primarily for use as a plant tie in plastics material such as polypropylene or polyethylene which comprises a holding member having a cup portion 31 defining on one side a socket 32 having a substantially circular base 33 and a side wall 34 which tapers inwardly to the mouth of the socket. That is, the diameter of the mouth of the socket is somewhat less than the diameter of the base 33 of the socket. Flexible ties 35 and 36 extend from opposite sides of the cup portion 31 flush with the rim 37 of the socket which is substantially planar. Radii 31a give added strength. Tie 35 has an enlarged aperture 38 with a necked portion 39 at one end. Tie 36 has barbed projections 40 extending from its edges along its length, such that tie 36 may be passed through aperture 38 in tie 35 to fasten the two ties together such that the barbed projections 40 are retained in engagement with the necked portion 39 in a manner known per se. However it will be seen that tie 35 is of shorter length than tie 36, such that when the two ties are fastened together (see FIG. 4) the retention of the barbed projections 40 in the necked portion 39 is enhanced by the resilience of the ties which produces a particular outward spring action that forces the parts together. A further advantage is gained wherein a series of fixings 30 may be more closely spaced in an injection mould beside each other such that the longer ties 36 and shorter ties 35 are alternately attached to the sprue (or waste plastics) so as to stagger the locations of the cup portions 31 of adjacent fixings 30 in the mould. When the fixings 30 are moulded in this fashion, sets of three fixings still attached to the sprue may be provided in a package which can result in or saving of space for packaging purposes.

FIG. 4a shows a pellet of a filled hardenable adhesive composition 41 which has been pressed into the socket 32 and then the rim 37 of the holding member has been pressed against a wall 42 such that the pellet 41 has become rock hard and has bonded to the wall. It should be noted that the pellet substantially fills the socket 32 but does not adhere to it. The holding member, although free to swivel about the hardened pellet 41, cannot be detached therefrom by virtue of the key provided by the inwardly tapering side wall 34 of the socket 32. In other words, as shown in FIG. 4a, the opening of the socket is of smaller cross-sectional area than the interior thereof. There may be small ribs projecting from the inside walls of the socket (not shown) and extending around the socket at spaced intervals so as to provide an additional key. This means that if the fixing has not been located on the wall in the precise orientation which is desired, it can be swiveled to the desired orientation. This also allows movement of a plant stem 43 with respect to the wall 42 when secured by the ties 35, 36 during growth, or in windy conditions.

FIG. 4b shows an alternative profile of the socket 32 of the fixing 30 of FIG. 3, wherein the base 33 of the socket includes a domed portion extending towards the mouth of the socket. FIG. 4c shows another alternative profile of the socket 32, including a conical portion extending towards the mouth of the socket. The advantages of both of these socket profiles are that less of the filled hardenable adhesive composition is required to fill the socket cavity, and that the domed or conical portion tends to push the portion of the composition in the socket into contact with a hard surface and also into the corners of the socket in use.

FIG. 5 shows a ribbon of composition type (a) as described above including layers of an epoxide resin component 18 with a layer of mercaptan/amine-accelerated polyamide hardener 19 encased therebetween. Backing sheets 20 on each side of the ribbon 5 form a protective cover, and portions of the composition can be "torn" off along the transverse perforations 21, the backing sheets removed and a portion then mixed between the fingers to form a pellet of hardenable composition ready for use with the fixing of the present invention. Alternatively, the backing sheets are first peeled back, and portions of the composition are then torn from the ribbon. Individual portions are preferably identified with indicia, such as a Trade Mark, printed on the backing sheets between adjacent perforations. Alternatively, the individual portions may be provided separately in tablet form, such as small cubes completely covered in backing material.

FIGS. 6 and 7 show an embodiment of the invention particularly suitable for use as a cable grip, e.g. for supporting electric cable on concrete or metal surfaces especially where difficulty might be encountered if standard cable grips using nails or screws were to be employed. The wall fixing of this embodiment is made of plastics material and comprises a cup 8 defining a socket 9 with inwardly-tapering walls similar to the socket of the plant tie illustrated in FIGS. 3 and 4, and a lug 10 extending from one side of the base of the cup from a hinge line 11 (shown in dashed outline in FIG. 6) and adapted to interfit with a corresponding slot 12 on the opposite side of the base of the cup 8. The base of the cup 8 is concave and forms a channel 13 adapted to receive an electric cable. In use, a pellet of a filled hardenable adhesive composition is pushed into the socket 9 and the fixing is then pressed onto a clean hard surface so that the pellet adheres to the surface. As shown in FIG. 7, an electric cable 14 is placed in the channel 13 when the pellet has hardened and the lug 10 is then pressed into engagement with the slot 12 to grip the cable. The cable grip of this embodiment can be made to a variety of different sizes to fit standard cable sizes.

Figure 8A:
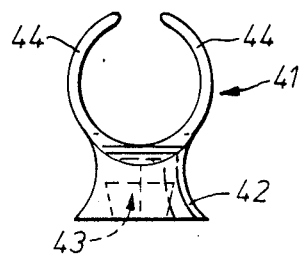
FIG. 8a shows front elevation of a pipe clasp according to a fourth embodiment.
Figure 8B:
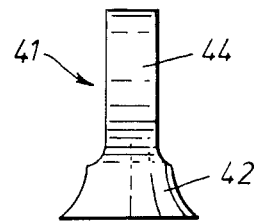
FIG. 8b shows a side elevation of the pipe clasp of FIG. 8a, FIG. 9a shows a front elevation of a stud fixing suitable for plastics-coated wire mesh, according to a fifth embodiment.

Referring to FIGS. 8a and 8b, a pipe clasp 41 in accordance with a fourth embodiment of the invention comprises a clasp member 42 having a frusto-conical socket 43 on one side thereof for reception of a portion of a filled hardenable adhesive composition and upstanding resilient arms 44 on the other side. The arms 44 define between them a space corresponding to, or slightly less than, the outer circumference of a pipe such that the pipe can be inserted into that space by drawing the arms apart, or simply pressed into the space from above, and then gripped between the arms when they have returned to their normal position as shown. The clasp of this embodiment can be made to a variety of different sizes to fit standard pipe diameters.

The advantage of this clasp is that it can be used for example to fix pipework against concrete by means of the composition referred to above in awkward locations where it would be difficult to use a drill to secure known fixings which employ a screw or bolt fastener. In the case of pre-stressed concrete, it is inadvisable to drill holes as there is a danger of penetrating tensile steel reinforcing rods which may eventually cause the concrete to crack. The pipe clasp is preferably made of strong resilient plastics material.

Figure 9A:
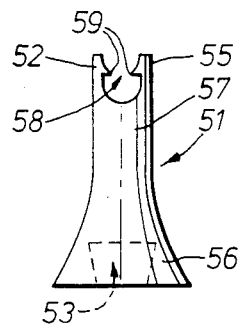
FIG. 9b shows a longitudinal cross-section of the stud fixing of FIG. 9a, with a section of wire mesh gripped by the stud fixing.
Figure 9B:
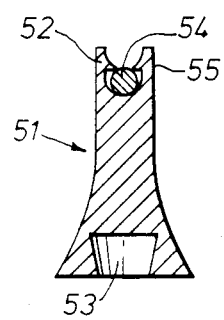

FIGS. 9a and 9b show a fifth embodiment of the invention comprising a stud fixing 51, again preferably made of strong resilient plastics material. It includes a holding member 56 having a frusto-conical socket 53 on one side thereof for reception of a portion of a filled hardenable adhesive composition and an upwardly-tapering portion 57 extending from the socket 53. At the top of the portion 57 there is a transverse groove 58 having inwardly projecting spurs 59 defined by upstanding gripping arms 52 and 55. This stud fixing is adapted for supporting plastics or plastics-coated wire such that when the wire is pressed into the groove 58 it is positively retained therein (as shown in FIG. 9b) by virtue of the spurs 59 which allow the wire 54 to be pressed into the groove 58 but then project over the surface of the wire making it difficult to remove the wire. A number of the stud fixings in accordance with this embodiment may be used to support a section of plastics or plastics-coated wire mesh against a wall for use as a garden trellis for training plants. The portion 57 acts as a spacer, to space the trellis away from a wall in use.

Figure 10A:
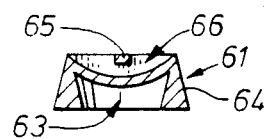
FIG. 10a shows a side view of a stud fixing suitable for wire or twine or as a cable-bundling strap according to a sixth embodiment.
Figure 10B:
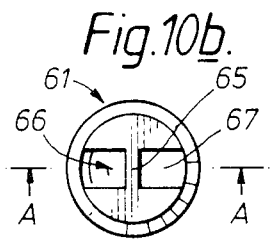
FIG. 10b shows a plan view of the stud fixing of FIG. 10a, and FIG. 11 shows a side elevation of a bar fixing for supporting parallel lengths of wire or twine according to a seventh embodiment.

FIGS. 10a and 10b show a sixth embodiment of the present invention comprising a stud fixing 61, which includes a nylon holding member 64 having a socket 63 on one side as before for reception of a portion of a filled hardenable adhesive composition, and a bar 65 on the other side bridging a depression 67 formed in the holding member 64. The bar 65 defines an eye or aperture 66 through which a length of twine or wire or a cable-bundling strap may be passed to act as a tie. When this stud fixing is secured to a hard surface by the composition it can be used as a plant tie or a cable-bundling strap when used in conjunction with a length of twine or wire, for example plastics-coated wire for garden use, or a Thorsman nylon cable-bundling strap. The stud fixing 61 is suitable for heavy-duty use and nylon is the preferred material for added strength.

Figure 11:
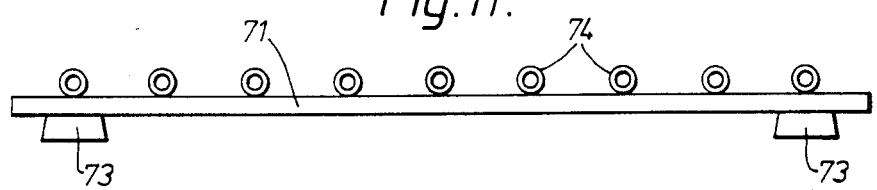

FIG. 11 shows a seventh embodiment of the present invention which comprises an elongate holding member 71 being a flat bar having on one side socket members 73 adjacent each end of the bar for reception of respective portions of a filled hardenable adhesive composition, and on the other side a line of upstanding loops 74 equally spaced apart along its length. In use, two or more of the bars 71 may be affixed to a wall by using portions of the compositions in an upright position at spaced intervals along the wall. Twine or garden wire is then threaded through the loops 74 between the bars to act as a support for climbing plants such as sweet pea or clematis.

The embodiments of FIGS. 10a, 10b and FIG. 11 may form a kit of parts comprising a plurality of stud or bar fixings, a plurality of portions of a filled hardenable adhesive composition together with a reel of garden wire, and users instructions. Likewise the embodiment of FIGS. 9a and 9b may form a kit of parts comprising a plurality of stud fixings, a plurality of portions of a filled hardenable adhesive composition, together with a section or sections of plastics or plastics-coated wire mesh, and users instructions.

When using a wall fixing of the present invention on unprepared surfaces, it is advisable to remove dust or loose surface material first before pressing the pellet of the filled hardenable adhesive composition with the holding member onto the surface to ensure optimum adhesion. A small wire brush may be optionally provided in the kit of parts for this purpose. The wall fixing using an epoxy adhesive is unsuitable for use on plastics surfaces to which an epoxy adhesive composition will not bond, unless the plastics surface has been coated with material to which such a composition will normally bond, for example paint.

I claim:

1. A fixing device for use on hard surfaces comprising in combination a holding member for holding elements to be supported against the hard surface, said holding member having a cup portion defining a socket, said socket having an opening with a cross-sectional area which is less than the cross-sectional area of the interior of the socket, and a portion of a filled hardenable adhesive composition of sufficient volume to fill the socket in the holding member wherein the composition includes an adhesive component and a hardener component which are separately present in the composition, the composition having the consistency of putty and being workable by hand to mix the two components and activate a hardening reaction in the composition, so that the portion of the composition placed in the socket can bond the fixing device to the hard surface.

2. A fixing device as claimed in claim 1 wherein the holding member is made of plastics material.

3. A fixing device as claimed in claim 2 wherein the socket includes means to provide a key between the socket and a portion of the said composition placed therein, such that when said portion is in a hardened state it is positively retained in the socket.

4. A fixing device as claimed in claim 3 wherein the inside wall or walls of the socket taper inwardly towards a rim defining the mouth of the socket which inside wall or walls comprise the means to provide a key between the socket and a portion of the said composition placed therein.

5. A fixing device as claimed in claim 4, wherein the inside wall of the socket is of annular or frusto-conical configuration, whereby in use the holding member is free to swivel by its socket about a portion of the said composition when in a hardened state.

6. A fixing device as claimed in claim 1, wherein the filled hardenable adhesive composition comprises an epoxide resin adhesive component and a polyamide hardener component separately present in the composition, both components including inorganic inert filler material.

7. A fixing device as claimed in claim 1, wherein the portion of the said composition is in tablet form.

8. A fixing device as claimed in claim 1, wherein the portion of the said composition is provided by a separable portion of a ribbon of the composition wherein the ribbon includes separate layers of the adhesive and hardener components.

9. A method of supporting an element against a hard surface which comprises the steps of:
 (i) Mixing a portion of a filled hardenable adhesive composition of putty consistency including an adhesive component and a hardener component which are separately present in the composition in predetermined proportions, so as to form a pellet of the composition in which a hardening reaction has been activated,
 (ii) Pressing the pellet into a socket defined by a cup portion in a holding member, said socket having an opening with a cross-sectional area which is less than the cross-sectional area of the interior of the socket,
 (iii) Pressing the pellet with the holding member onto a surface at the desired position,
 (iv) Allowing a sufficient period of time to elapse for the pellet to harden,
 (v) Positioning an element adjacent the holding member and securing it thereto to support the element against or adjacent to the surface.

10. A kit of parts comprising in combination:
 (i) A plurality of holding members as defined in claim 1,
 (ii) A plurality of portions of filled hardenable adhesive composition as defined in claim 1, and
 (iii) Instructions for the user to combine the holding member and the portion of the composition for use as a fixing for elements including elongate elements such as plant stems, electric cables, cords wire, pipes, elements of a framework or mesh and the like.

* * * * *